United States Patent
D'Avela

(10) Patent No.: US 11,345,644 B2
(45) Date of Patent: May 31, 2022

(54) CONCRETE MIXING AND CONCRETE PRODUCTS

(71) Applicant: Concrete Products Group LLC, North Hamel, MN (US)

(72) Inventor: Canan D'Avela, Yuma, AZ (US)

(73) Assignee: Concrete Products Group LLC, North Hamel (MN)

( * ) Notice: Subject to any disclaimer, the term of this patent is extended or adjusted under 35 U.S.C. 154(b) by 0 days.

(21) Appl. No.: 16/854,549

(22) Filed: Apr. 21, 2020

(65) Prior Publication Data

US 2020/0247724 A1   Aug. 6, 2020

Related U.S. Application Data

(62) Division of application No. 14/980,389, filed on Dec. 28, 2015, now Pat. No. 10,662,121.

(51) Int. Cl.
| | |
|---|---|
| C04B 40/02 | (2006.01) |
| C04B 28/00 | (2006.01) |
| C04B 41/45 | (2006.01) |
| B28B 1/14 | (2006.01) |
| B28C 5/08 | (2006.01) |
| B29B 7/00 | (2006.01) |
| B28C 5/42 | (2006.01) |
| B01D 53/14 | (2006.01) |
| C04B 28/10 | (2006.01) |

(52) U.S. Cl.
CPC ...... C04B 41/4578 (2013.01); B01D 53/1475 (2013.01); B28B 1/14 (2013.01); B28C 5/0806 (2013.01); B28C 5/42 (2013.01); B29B 7/00 (2013.01); C04B 28/00 (2013.01); C04B 28/10 (2013.01); C04B 40/0231 (2013.01); Y02P 40/18 (2015.11)

(58) Field of Classification Search
CPC ...... C04B 41/4578; B28C 5/0806; B28B 1/14
See application file for complete search history.

(56) References Cited

U.S. PATENT DOCUMENTS

| | | | | |
|---|---|---|---|---|
| 3,754,954 | A | * | 8/1973 | Gabriel .......... C04B 40/00 106/674 |
| 3,758,034 | A | | 9/1973 | Broadfoot |
| 4,308,069 | A | | 12/1981 | Tsuji et al. |
| 4,802,836 | A | * | 2/1989 | Whissell .......... B28B 3/022 100/237 |
| 4,856,976 | A | | 8/1989 | Rook et al. |
| 5,139,721 | A | | 8/1992 | Castonguay et al. |
| 5,236,501 | A | | 8/1993 | Nomachi |
| 5,250,113 | A | | 10/1993 | Berke et al. |
| 5,358,214 | A | | 10/1994 | Bathe |
| 5,362,324 | A | | 11/1994 | Cenilli et al. |
| 5,432,212 | A | | 7/1995 | Honda et al. |

(Continued)

OTHER PUBLICATIONS

Masonry, Integral Water-repellent Mortar, Apr. 5, 2005 (Year: 2005).*

(Continued)

*Primary Examiner* — Armand Melendez
(74) *Attorney, Agent, or Firm* — Fish & Richardson P.C.

(57) ABSTRACT

Some implementations herein described improvements to concrete products and processes for producing concrete products that may provide a positive environmental impact and that can be stronger relative to the percent of cement used. Particular examples include improvements to zero-slump to near-zero-slump concrete mixture design, material storage and handling, batching, mixing, sequencing and curing processes, as well as forming and curing techniques.

16 Claims, 6 Drawing Sheets

(56) References Cited

U.S. PATENT DOCUMENTS

| | | | |
|---|---|---|---|
| 5,527,387 A * | 6/1996 | Andersen | B01F 3/1214 |
| | | | 106/693 |
| 5,624,493 A * | 4/1997 | Wagh | C04B 7/36 |
| | | | 106/738 |
| 6,113,379 A | 9/2000 | LaCroix et al. | |
| 6,258,161 B1 | 7/2001 | Kerkar et al. | |
| 6,322,742 B1 | 11/2001 | Bott | |
| 6,656,262 B1 | 12/2003 | Schwam | |
| 7,687,005 B2 | 3/2010 | Skidmore et al. | |
| 8,987,356 B1 * | 3/2015 | Owen | C04B 14/06 |
| | | | 524/5 |
| 2005/0276155 A1 | 12/2005 | Harris | |
| 2006/0185560 A1 | 8/2006 | Ramme | |
| 2008/0106009 A1 | 5/2008 | Naruse | |
| 2010/0195433 A1 | 8/2010 | Liet | |
| 2015/0101513 A1 | 4/2015 | Skovby | |
| 2015/0152006 A1 | 6/2015 | Guzzetta | |
| 2017/0008810 A1 | 1/2017 | Rademan | |

OTHER PUBLICATIONS

"Carbonation of Concrete," Understanding Cement, retrieved via Wayback Machine from URL <https://www.understanding-cement.com/carbonation.html>, available on or before Feb. 7, 2012, 2 pages.

Slump Test https://www.youtube.conn/watch?v=nnrU8DzcOkDc (Year: 2009).

\* cited by examiner

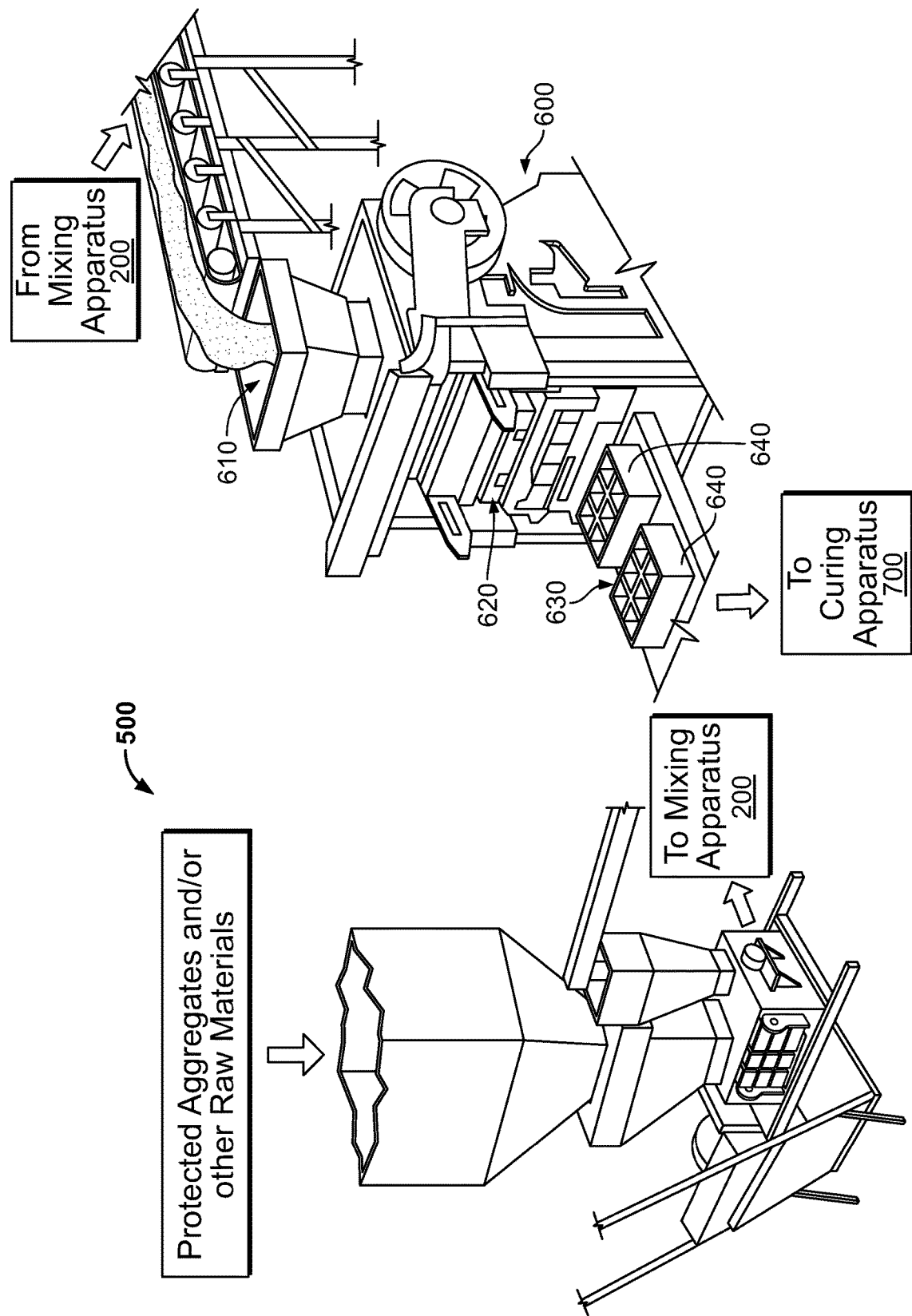

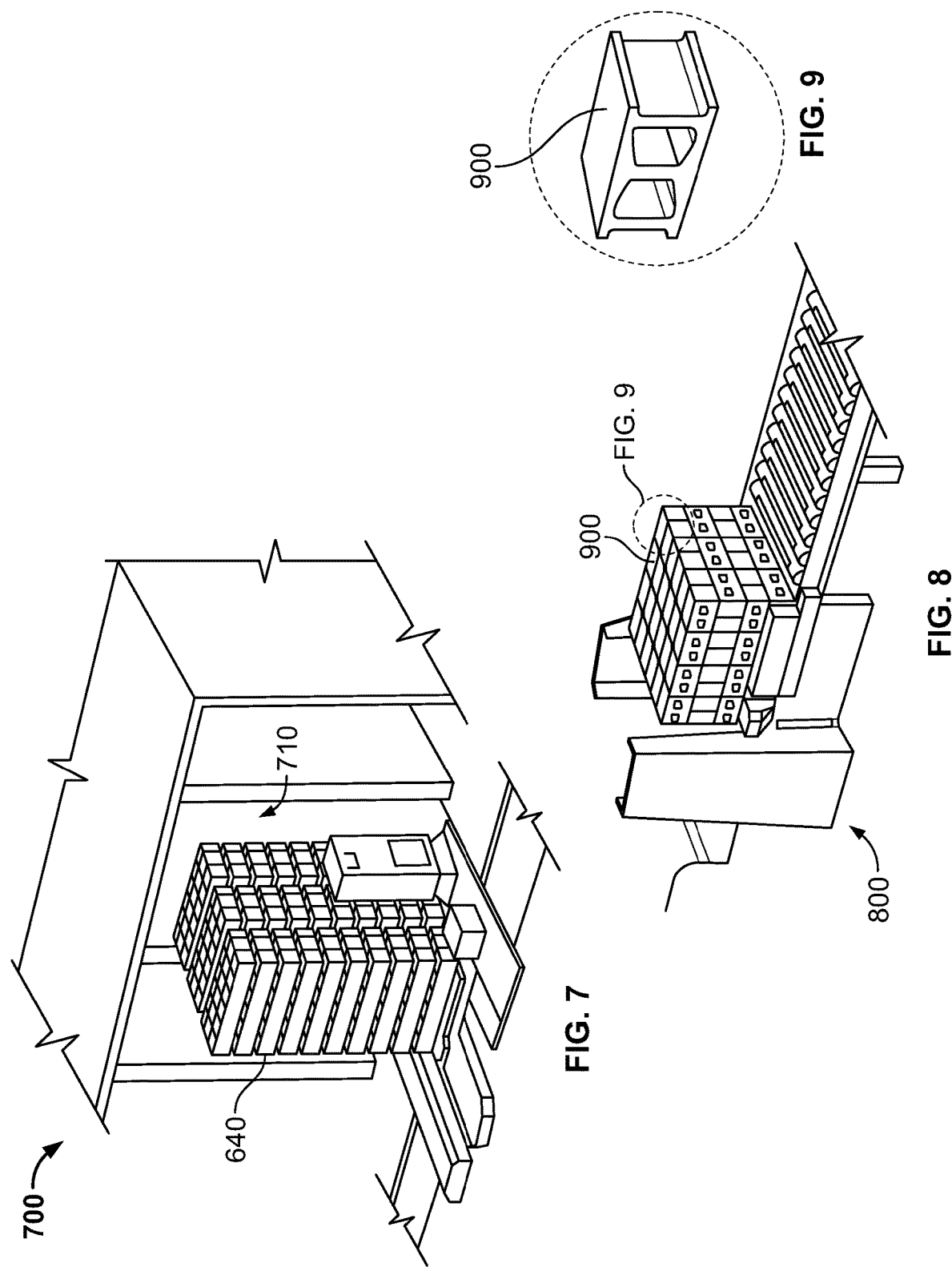

CONCRETE MIXING AND CONCRETE PRODUCTS

CROSS-REFERENCE TO RELATED APPLICATION(S)

This is a division of U.S. application Ser. No. 14/980,389 filed on Dec. 28, 2015 and entitled "Concrete Mixing and Concrete Products," the entire contents of which are incorporated herein by reference.

TECHNICAL FIELD

This document relates to improved methods of concrete mixing and concrete products, including for example, zero-slump to near-zero-slump concrete mix designs and methods that provide improved strength, durability, and/or environmental impact.

BACKGROUND

In its simplest form, concrete is a mixture of paste and aggregates, or rocks. The paste, composed of portland cement and water, coats the surface of the fine (small) and coarse (larger) aggregates. Through a chemical reaction called hydration, the paste hardens and gains strength to form the rock-like mass known as concrete. Within this process lies the key to a remarkable trait of concrete: it is malleable when newly mixed, strong and durable when hardened. These qualities explain why concrete can be suitable for building skyscrapers, bridges, sidewalks and superhighways, houses and dams.

A concrete block is often used as a building material in the construction of walls. It is sometimes called a concrete masonry unit (CMU). A concrete block is one of several precast concrete products used in construction. Others include segmental retaining walls (SRW), interlocking concrete pavers (ICP), veneer, and a host of other concrete products. The term "precast" refers to concrete products that are formed and hardened before they are brought to the job site. Most concrete blocks have one or more hollow cavities, and their sides may be cast smooth or with a design. In use, concrete blocks are stacked one at a time and may be held together at joints between the units with fresh concrete mortar to form the desired length and height of the wall. Additional load resistance is supplied by placing reinforcing steel (rebar, anchorage, etc.) and grout within the grout spaces of wall assemblies. Some applications may not use mortar and/or rebar but other means to reinforce and stabilize including friction, pins, geogrid, special sands, etc. After the concrete is thoroughly mixed (by mixing portland cement, aggregates, and water) and workable, it can be placed in forms before the mixture becomes too stiff. Through a series of chemical reactions including hydration, a cement paste develops then hardens and gains strength to form a matrix around the aggregates. During these chemical reactions, crystals, nodes, and other forms additionally develop on and within the paste as well as on the surfaces of aggregates or other portions of the concrete particles. In other words, the initial dry cement powder which comprises finely ground cement clinker, after exposure to sufficient water and mixing, changes into different chemicals and also while doing so the physical nodes in the paste grow and expand. Often they interconnect within the complex paste matrix. These reactions may also include aggregates such as mechanically interlocking as well as chemically interacting with the surfaces of aggregate particles.

In the production of precast concrete products (e.g., such as precast concrete blocks), the concrete is discharged into molds (for shaping the blocks) while the concrete mixture is still loose and "fresh." In many circumstances, it is desirable to minimize time that the concrete must remain in the mold before it is sufficiently hardened such that it will not "slump" when removed from the mold. Thus, the concrete mixture can sometimes be provided into the mold as a "zero-slump concrete" or "near-zero slump concrete," which has a sufficiently high consistency and/or set time to allow forming into unit configurations such as by a block-making machine. Once formed the then unit-configured concrete is ejected from the mold for subsequent curing.

When the concrete blocks are initially removed from the mold (referred to as "green" units or "wet" units), they are in the form of precast wet concrete products that are then ready to be placed in a curing rack, which may hold several hundred wet units; the racks holding the pallets in turn are moved into a curing chamber. Normally, an individual curing chamber (frequently called a "kiln", though not operating at high temperatures) takes about two hours if not more time to "charge" or load. Some curing chambers can be built to a much larger capacity and continually accept new, "green" or "wet" product until the end of a production shift. Additionally it is traditionally assumed to incorporate a long "preset" time—also measured in hours such as 4-5 hours— once the curing chamber is charged (filled), for the just-formed wet units to set and then begin hardening, Curing can ensure the continued hydration of the accessible portions of cement within the paste so that the concrete continues to gain strength. There are several basic types of curing chambers or kilns. A common type is a "low-pressure steam" curing chamber. In this type, the blocks are held inside without adding moisture during preset at ambient temperature to allow them to set and then harden slightly. A heavy steam is then gradually introduced to raise the temperature at a controlled rate of not more than approximately 60° F. per hour (33° C. per hour). When the peak curing temperature has been reached and sufficient "soak" time has been attained, the steam is shut off. The blocks are then partially dried either by exhausting the moist air or by simply extending the curing time until removal. The whole curing cycle takes about 24 hours to several days. Alternately, certain climates allow for no additional use of steam as a heat and moisture source within the curing chamber and rather take advantage of one of the properties of cement hydration, that being the "heat of hydration." The exothermic reaction during cement hydration contributes to certain economies of curing that are usually not available in colder climates. However there may still be unresolved color, efflorescence, and other aesthetic and environmental issues.

Another type of kiln is the "high-pressure steam" kiln, sometimes called an autoclave. In this type, the temperature is raised to approximately 375° F. (191° C.), while the pressure is also raised to approximately 116 to 174 psi (8 to 12 bar). The blocks are allowed to heat soak for about 5-12 hours. The pressure is then rapidly vented, which causes the blocks to quickly release their trapped moisture. The autoclave curing process requires more energy and a more expensive kiln, but it can produce blocks lighter in weight though with less compressive strength.

The quality of the cement and the amount and type of aggregate, which are implemented during the mixing process before discharging the mixture into the mold, are some of the controlling features affiliated with raw materials that can dictate the character of the concrete block. Conventionally, in a traditional zero-slump to near-zero-slump concrete mixing method for a normal weight density mix, the water-cement ratio may be traditionally minimized to an approximately range between 0.35 to 0.50 by weight so as to ensure desired formability, strength, and aesthetic properties. (This traditional amount of water, based upon traditional batch methods, is referred to as "100% of the total assumed batch water.") Yet due to unprotected aggregates received or becoming wet, a 6,500 pound normal-weight batch may only take 40 pounds of added water or less, added often primarily toward the end of the batch cycle rather than the beginning of the batch cycle. There are usually narrow limits to how much water a certain mix can accept in a traditional mixing process before undesirable properties appear. Water may be further limited by modern water reducing admixtures, which when used do tend to assist in the speed of strength development but at a cost of increasing the amount of cement per batch and/or other compromises. The aesthetic surface feature of "swipe," which gives a glossier and pasty smear look to the finish, is traditionally accomplished by including synthetic plasticizing admixtures and/or additional water. However, adding excess water in a traditional mixing process can reduce the consistency of the zero-slump to near-zero-slump concrete mixture prior to discharging the mixture into the mold. As such, the unit shape stability, setting, and hardening characteristics may be affected. Excess moisture in a traditional mixing process may also result in a need for longer residence time in the mold and/or undesired slumping or deforming of the concrete products after the mold, longer curing time, increased curing energy burdens, strength reduction, unacceptable aesthetic texture, color, and/or uneven compression banding.

As to the amount of cement used within a batch during the mixing process (before discharging the mixture into the mold), one traditional long-term average for zero-slump to near-zero-slump concrete mix is about 12.4% cement of the aggregate by weight using traditional methods (excluding hardscape products).

SUMMARY

Some embodiments herein described improvements to concrete products and processes for producing concrete products that have a positive environmental impact, that are stronger relative to the percent of cement used, or alternately that have an increased percentage of aggregate while maintaining a desired strength, that have improved color uniformity, and/or that produce less efflorescence. Particular examples include improvements to zero-slump to near-zero-slump concrete mixture design, material storage and handling, batching, mixing, sequencing and curing processes, as well as forming and curing techniques, which can be implemented to reduce a percentage of an amount of cement used in zero-slump to near-zero-slump precast concrete products that meet the various ASTM or end user specifications, and which further can reduce production costs. Optionally, depending upon the commitment to the processing upgrades described herein, the cement-to-aggregate percentage for normal weight, normal strength units may be significantly than the 12.4% national long term average (not including hardscape products) using traditional methods. Also, the improvements described herein include environmental benefits. For example, concrete products upgraded as provided herein can sequester ambient carbon dioxide at an accelerated rate as compared to the amount of cement mixed into zero-slump to near-zero-slump concrete using traditional methods. In some embodiments, the zero-slump to near-zero-slump concrete mix design, material storage and handling, batching, along with sequencing and other related mixing processes, forming, and curing techniques provided herein can result in an increased average unit compressive strength relative to the 12.4% national long term average (not including hardscape products) using traditional methods. Or alternately, the improvements described herein may provide an option for a 10-50% reduction of the ratio of cement-to-aggregate in a concrete product while maintaining compressive strength, color, and other attributes simultaneous to an increase in carbon dioxide percent sequestration relative to the amount of cement used.

Some implementations herein include a method of forming a concrete product from a batch of zero-slump to near-zero-slump concrete mixture including at least a predetermined total amount of aggregates, a predetermined amount of water, and a predetermined amount of cementitious material. The method may include mixing an initial portion of the predetermined amount of aggregates and the predetermined amount of water during an initial mixing stage to provide a non-cementitious slurry. Optionally, the initial portion of the predetermined total amount of aggregates being 50% or less of the predetermined amount of aggregates. Also, the method may include mixing the non-cementitious slurry with the predetermined amount of cementitious material during an intermediate mixing stage to provide a slumped cementitious mixture. The method may further include mixing a remaining portion of the predetermined total amount of aggregates and the slumped cementitious mixture during a subsequent mixing stage after the intermediate mixing stage. Also, the method may include, after the subsequent mixing stage, discharging the zero-slump to near-zero-slump concrete mixture into a mold to form at least one green unit having a predetermined shape. Optionally, the zero-slump to near-zero-slump concrete mixture having a residence time in the mold of less than 30 seconds. Also, the method may include curing the at least one green unit so as to form a concrete product.

Particular implementations described herein include a concrete mixer for producing a zero-slump to near-zero-slump concrete mixture. The mixer may include a mixing chamber configured to receive staged delivery of aggregates, water, and a cementitious material. The mixer may further include at least one mixing blade connected to a shaft extending through the mixing chamber, and the at least one mixing blade may include a plurality of shearing elements extending from a surface of the mixing blade. Also, the mixer may include a cleaning ring positioned around the shaft in the mixing chamber such that mixing a mixture including at least cement and water in the mixing chamber by rotating the at least one mixing blade causes the shearing elements to periodically engage the cleaning ring to cause the clearing ring to twist relative to the shaft.

In some implementations described herein, a concrete product is formed from a zero-slump to near-zero-slump concrete mixture and configured to sequester greenhouse gasses. The concrete product may include a green unit comprising a zero-slump to near-zero-slump concrete mixture and having a molded predetermined shape of a concrete masonry unit. The green unit sequesters ambient carbon dioxide over a period of time as it is cured and hardened so that the concrete product sequesters carbon of at least 5% weight percent of the cement over a 28 day period.

The systems and methods described herein can include improvements to manufacturing a precast concrete product having a cementitious matrix yielding significantly better compressive strength and additional environmental benefits. In one example, the mix design and batching methods described herein can advantageously "protect" delivered aggregate from additional forms of moisture, ice, and snow such as from the weather. Sufficiently high walls of outdoor storage bins incorporating collection troughs or guttering to drain away all such water forms as well as protection from related incidental de-icing chemicals, and further inclusive of roofing over the aggregates are composite techniques comprising one of many methods. This "protected aggregate" can promote a more stable water demand along with a more reliable quality of entrained water from batch to batch, reducing consequential batch variations which in turn can affect compressive strength, color variations, texture, swipe, compressive banding, efflorescence, etc.

In another example, the mix design and batching methods described herein can, not only provide protection from additional moisture, but may also drain the protected aggregates of accumulated moisture prior to entering the mixer, thus reducing net as-received moisture content. For example, the wet aggregates and other raw materials can be maintained upon sloped, absorbable, porous, or otherwise drainable surfaces including within protection silos, bins, and hoppers so as to promote the gradual reduction of as-received water. As the amount of net as-received raw materials' water becomes lower prior to entering the mixer, total batch water demand increases. In a preferred embodiment, the initial consistency in the mixer with partial (dryer) aggregate, water, and optional admixture may act less like a zero-slump to near-zero-slump and instead one of a chemically active slurry. For example, the "protected" aggregates approach the surface saturated dry (SSD) % moisture, and it would be less than the SSD in some preferred implementations.

Further, the mix design and batching methods described herein can sequentially disperse the aggregate into the mixer at different times (rather than dumping all aggregates, cement, and water into the mixer at substantially the same time at the beginning of the mixing process). This partial or "staged" aggregate delivery can be designed herein so that only a reduced amount of aggregate shares in the adsorption of valuable moisture to assist with shearing of the cementitious paste. Preferably, a reduced amount of the protected aggregate is delivered into a mixer at an initial stage (less than 60% of the total aggregate at this stage, and the cementitious material is added at a subsequent stage) so that the aggregate does not consume excessive moisture, which might otherwise induce high viscosity and cause mixing to be far less efficient. For example, the amount of the protected aggregate delivered into the mixer at the initial stage can be 50% or less of the total aggregate, more preferably 5% to 40% to the total aggregate, and 5% to 30% of the total aggregate in particular embodiments described herein. Inclusive of this sequence stage are optional admixtures designed to further reduce surface tension, and increase dispersion, chemical acceleration, set time, and/or strength. The slurry at this initial mixing stage is therefore primed to not only chemically react more effectively in a dispersed, fluidized state, but is further enhanced via the inclusion of optional admixtures. The partial aggregate (from the "first" stage of delivering aggregate into the mixer), water, and optional admixture(s) within the slurry is given an adequate though short amount of time to disperse in the mixer, such as about 30 second in some implementations. In particular embodiments, the mixer can provide mixer shear that assists this dispersion. After the initial stage, the non-cementitious slurry may be fluidized in a highly slumped condition, and it is then ready to react with the incoming cementitious raw material at a subsequent stage of the mixing process.

Additionally, the mix design and batching methods described herein can dispense water into the mixture in a distinct manner. For example, in particular embodiments, the mix can be designed so that "100%+ water" is incorporated into the mix at the very beginning of the batch sequence and dispensed at a rapid pace (rather than, for instance, a conventional dispensation last 90 seconds or more during the mixing process). As used herein, the term "100%+ water" means that the water dispensed into the batch of concrete mixture is greater than the "100% of the total assumed batch water" (described above) due to the advantageous mix design and batching methods described herein (which induce the concrete mixture to be more reactive and consume greater moisture amounts while still achieving a zero-slump to near-zero-slump concrete mix). In a preferred embodiment, the total water discharged across the majority of the raw materials' surface area (including that of the first partial allotment of the protected aggregate) within the mixer in less than 10 seconds, often in about 6 seconds. Additionally, the mix design and batching methods described herein can dispense optional admixture(s) into the mixture in a distinct manner. In particular embodiments, the mix can be designed so the optional admixture(s) are dispensed into the mix at a rapid pace using, for example, high pressure, multiple, fine nozzles that spray the entire amount of the optional admixture(s) in less than 10 seconds, more preferably about 6 (preferably keeping pace with both the first partial (drier) aggregate and water deliveries into the mixer).

Accordingly, some embodiments of the mix design and batching methods described herein can dispense the first partial allotment of protected aggregate, water, and certain optional admixture(s) into the mixer according to fast-paced charging signals that spaced only about a second or so apart so that partial aggregates, water, and certain optional admixture(s) are sent into the mixer in a rapid manner and then mixed for a period of time prior to the delivery of cementitious raw materials. Such a mix design and batching method can provide a highly reactive and dispersed slurry (in some circumstances, at about 30 seconds from the start of the batch cycle) that is therefore primed for chemical reactions with cementitious raw materials dispensed after the initial mixing stage.

In addition, some embodiments of the mix design and batching methods described herein can advantageously dispense the remaining allotment of the aggregate (e.g., the portion that was not yet added into the mixer at the initial stage) after the second mixing stage when the cementitious raw materials were mixed into the slurry. Thus, in a third mixing stage after the cement is sufficiently mixed, the remainder of the aggregate is added into the mixer (rather than, for example, adding in additional water at an end stage of the mixing). Optionally, soon after the remaining allotment of the aggregate is delivered into the mixer, one or more optional additives such as pigment, integral water repellent, or the like can be added into the mixer. In some implementations, the addition of these latter-stage raw materials (e.g., the remainder of the aggregate and optional additives) after the intermediate mixing stage of the batch cycle serves to transition the concrete mix to a zero-slump or near-zero-slump concrete mix.

The concrete mix design and related methods described herein (including the staged mixing described above) can advantageously add the cementitious raw materials into the mixer at a stage (e.g., the second stage occurring after the initial stage) so that the cementitious raw materials receives valuable exposure to a significantly high percentage of moisture when it is first introduced and when the slurry is more reactive to cement and/or moisture. In particular implementations, as previously described, the mix can be designed so that 100%+ water is incorporated into the mix at an initial stage of the batch sequence. For example, the water-to-cement ratio by weight may be measurably higher, especially where only an initial portion of the aggregate is in the mixer (the remaining allotment of the aggregate is not yet added). Depending upon the amount of water drained or evaporated from a raw material in comparison to that same material's SSD, in some cases, the initial ratio of water-to-cement by weight (when the cementitious raw materials are initially added into the mixer) in a method of mixing normal weight density with normal strength concrete provided herein may be from greater than 0.5:1 to as much as 2.0:1, more preferably from 0.55:1 to 1.5:0, still more preferably from 0.70:1 to 1.4; still more preferably from 0.85:1 to 1.25:1, and about 1:1 or more in preferred embodiments. Optionally, the cement delivery could be separated into two or more deliveries so that the first portion of cement delivered into the mixer has a short but valuable exposure to a very high percent of moisture. This would afford an opportunity to increase overall water demand even further into 100%+ water levels. In these circumstances, the mixture may provide a high slump, fluid consistency at the beginning of the batch cycle, but again the net water demand will increase while the mixing cycle continues to completion with a zero-slump to near-zero-slump concrete mix.

This intermediate condition (in some implementations) during the mixing process—that of adding not just 100% of the total assumed batch water based upon traditional batch methods, but 100%+ water—may provide an additional benefit of cementitious exposure to excessive, chemically reactive moisture. It is believed that, in accordance with particular embodiments of the concrete mix design and related methods described herein, such an exposure increases the water demand of the cementitious raw materials beyond what is otherwise assumed in many traditional mixing methods, because far more cementitious material is exposed and given an opportunity to absorb increased amounts of reactive moisture. Therefore the water to cementitious ratio (w/cm) increases in part because the water demand of the cementitious raw materials increases. Further, in those embodiments that implement mixer shear (described below), the extra amount of hydrated material is exposed to mechanical shear mixing energy producing increased cementitious paste. For example, the mixer may force more chemical reactivity beyond that which would be otherwise caused by merely gently tumbling mix agglomerates. Also in these embodiments, as shear mixing continues onto the cementitious paste—the paste now increased in proportion—the paste is forced to comingle and react further, which can result in both increased chemical reactions as well as more regulated chemical reactions. As such, there may be a reduction in the percentage of unhydrated cement within the paste (which might otherwise cause self-desiccation, often leading to undesirable waste and flash setting). Therefore, within normal weight density mixes incorporating the technological improvements herein as an example, final water to cementitious ratios may be approximately 0.9 or even higher to as much as 2.0 while still discharging a zero slump to near zero slump consistency after the final stage of the mixing process in the mixer apparatus.

Some embodiments herein also include improvements to the structural characteristics of the mixer apparatus. For example, in particular embodiments of the mix design and batching methods described herein, the mixer can be configured to initially shear the water, aggregate, and optional admixture(s) with sufficient force to separate and disperse clumps or agglomerates of (drier) aggregate with the water and admixture prior to the additional cementitious cohesive forces beginning to act. Thus, at this stage of the mixing process, deagglomeration may be promoted. In particular implementations, the overall mixing can result in more efficient, homogenous mixes due to the judicious shearing effects. As described in more detail below, the mixer apparatus can be equipped with a combination of liners, shovels, blades, cleaning and shearing rings in conjunction with interlocking bars, or other structures in such a way as to smear, stretch, ply, knead, or otherwise shear by physically forcing a greater surface area engagement of cementitious masses, agglomerates, and flocs as well as of the aggregates within the concrete mix. Herein, "deflocculation" refers to all forms of shear applied to the constituents within the mixer from beginning to end of the batch cycle. When the cementitious raw materials are added into the mixer apparatus (having one or more shearing elements) after mixing of the initial slurry (after the initial mixing stage as described above) is adequately dispersed within the mixers, the second stage of mixing can result in significantly faster hydration, set and strength development, either increased strength and/or cement efficiency, and reduced efflorescence. Moreover, the improved environmental benefits such as carbon dioxide sequestration are also poised to increase by the end of 28 days.

In some cases, the mixer apparatus can include shearing elements that extend from one or more mixing blades to intermittently engaging one or multiple ring(s) in combination with engagement bars of various types positioned around a rotating shaft driving the mixing blades. One or more ring(s) positioned around the rotating shaft can be one or more rings, such as one or more cleaning rings configured to operate as shearing rings. The shearing elements can comprise steel. For example, the shearing elements comprise a steel alloy also present in the mixer blades and/or the cleaning rings. In some implementations, shearing elements can extend from an inside surface of a drum such that they intermittently contact a ring positioned around a rotating shaft driving one or more mixing blades. Optionally, the shearing elements can be provided as elongated extensions along one or more mixing blades and/or on an inside surface of a drum. In some cases, the shearing elements can form elongated straight lines along a surface of one or more mixing blades and/or on an inside surface of a drum. In some embodiments, the shearing elements can form elongated curved lines along a surface of one or more mixing blades and/or on an inside surface of a drum. In some cases, a rotating shaft can have an exterior diameter of about 9.9 inches, a gap between the rotating shaft to the inside surface of the drum can be between about 36 and 37 inches, the shaft can have a length of about 83 inches, and the cleaning ring can have a diameter of about 27 inches. A cleaning ring can be intermittently contacted by shearing elements on one or more mixing blades to cause the cleaning ring to rotate about the rotating shaft and/or twist relative to the rotating shaft, which can provide additional shear to the cement mixture.

Optionally, the concrete mix design and related methods described herein can take advantage of and account for, not only chemical and static cohesive forces, but also mechanical and ferromagnetic cohesive forces (present within both the aggregates, the cementitious mix components as well as pigments and other raw materials). As previously described (and further described in more detail below), during the initial stage in which the water, first portion of the (drier)

aggregate, and optional admixture(s) are initially mixed and sheared within the mixer before the cementitious raw materials are added to the mixer. Then, the mixing and shearing effect during the second stage can further disperse cement, cementitious raw materials, and/or and other optional additives within the mixture with sufficient force to separate agglomerated masses and/or flocs of cementitious material from larger cementitious masses. Portions of the mixture having insufficiently mixed larger concrete agglomerated masses are also subject to this shearing, which can then expose finer interior particles to water and admixtures as an aide in deflocculating (so as to promote improved hydration and then continued shear toward increased paste development occurs). In these circumstances, because the hydration products and byproducts are engaged and sheared further into a co-mingled, interactive paste, it reduces the likelihood that the chemical and mechanical virtues are partially wasted such as in pockets of air and/or fluid and/or along particle edges. The concrete mix design and mixing methods described herein can overcome the chemical, static, mechanical, and ferromagnetic cohesive forces during the mixing process, and furthermore can do so in a cost effective manner.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 5 a perspective view of a weigh batcher apparatus for inputting materials into the concrete missing apparatus of FIG. 2.

FIG. 6 a perspective view of a concrete mold apparatus for forming the concrete product described in connection with FIG. 1.

FIG. 7 a perspective view of a curing chamber apparatus for forming the concrete product described in connection with FIG. 1.

FIG. 8 a perspective view of a palletizer apparatus for a plurality of the concrete products described in connection with FIG. 1.

FIG. 9 a perspective view of an example of the concrete product described in connection with FIG. 1.

Like reference symbols in the various drawings indicate like elements.

DETAILED DESCRIPTION

Zero slump to near zero slump concrete batching, mixing, sequencing, and curing processes provided herein can produce concrete products that have a positive environmental impact, that are stronger, and/or that have an increased percentage of aggregate while maintaining a desired strength, that have improved color stability, and/or that produce less efflorescence. Concrete batching, mixing, sequencing, and curing processes provided herein can include one or more of the following processes: aggregate selection, protection, storage, drainage, evaporation, and handling; raw material selection, handling, storage, and dispensing, batching, mixing, molding, curing, and further processing. In some embodiments, the concrete mixture formed can be a zero-slump or near-zero-slump concrete mixture, which can have little or no slump after a short residence time in a mold. In the production of precast products, reduced residence time in a mold can increase production rates. Zero-slump or near-zero-slump concrete mixtures can thus improve production rates, but need to have a sufficiently high consistency after a short residence time to ensure that the product does not become distorted after leaving the mold. The term "zero-slump or near-zero-slump concrete" is distinct from "ready-mixed" concrete, which is concrete that is manufactured in a factory or batched at a batching plant and then delivered to a work site, often by truck mounted in—transit mixers, where it can be cast in situ. To permit transport, ready-mix concretes have consistencies of higher slump and may have higher water contents than those found in zero-slump or near-zero-slump concrete mixes. In some cases, zero-slump concrete or near-zero-slump concrete is sometimes described as being a dry-cast concrete.

As used herein, a "zero-slump to near-zero-slump" concrete mixture means a concrete mixture that has less than 1 inches of slump when tested according to ASTM International C 143 as in force on Jan. 1, 2015. As a comparison, ready-mixed concrete can have a slump ranging between 43 and 8 inches in fresh conditions. In some preferred implementations, zero-slump to near-zero-slump concrete mixtures provided herein can have a slump of 0.2 inch or less when tested according to ASTM International C 143 as in force on Jan. 1, 2015.

Figure 1:
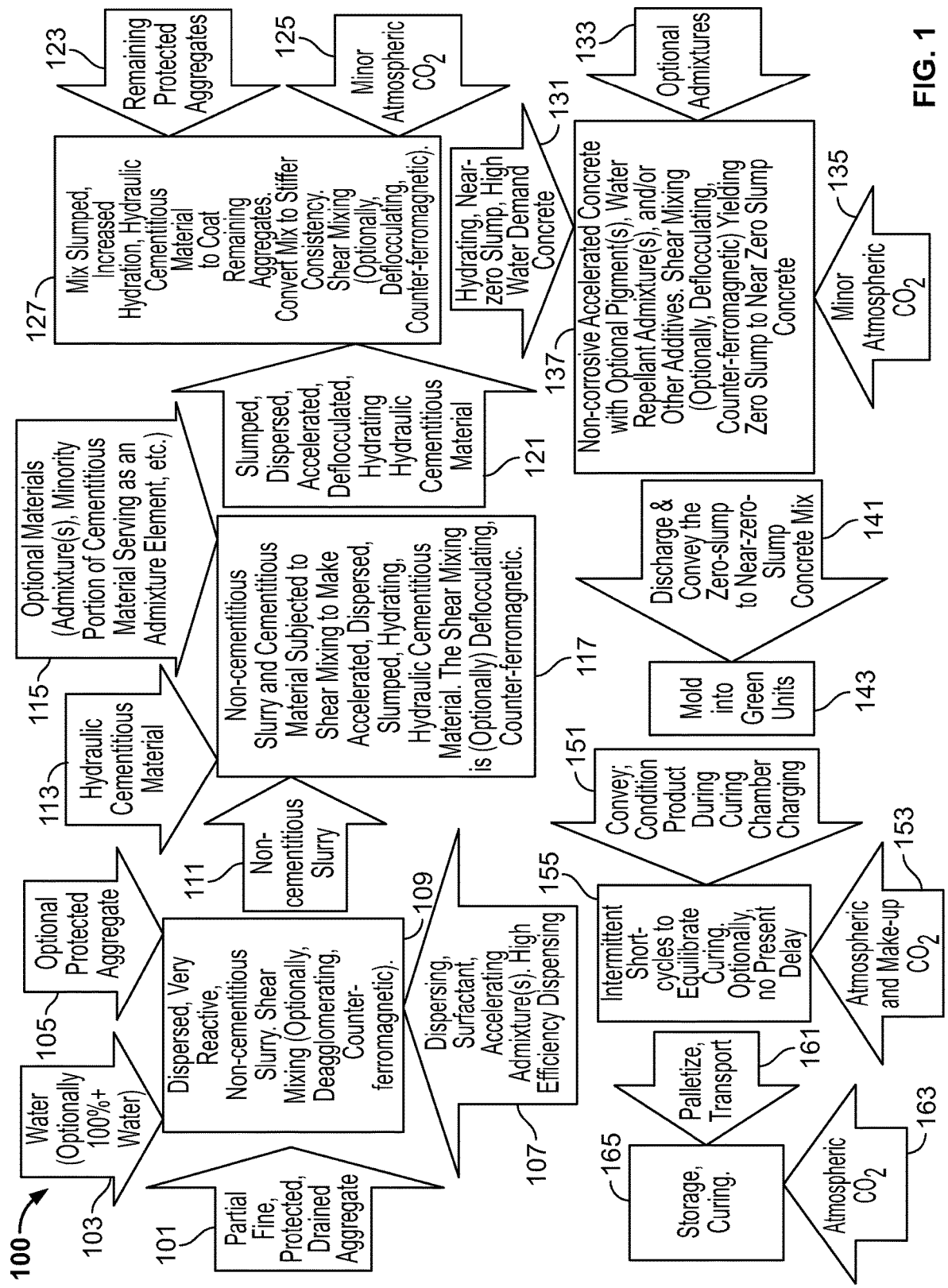
FIG. 1 is a flow chart illustrating an exemplary method of forming a concrete product provided herein.

In accordance with some embodiments described herein, FIG. 1 is a flow chart illustrating an example method 100 of mixing components to provide a zero-slump or near-zero-slump concrete mixture and then forming a concrete product from the zero-slump or near-zero-slump concrete mixture. A further description of the example method 100 is provided in more detail below. In implementations described herein, the zero-slump to near-zero-slump concrete mixture can have a water to cementitious ratios (w/cm) as high as 0.9:1 or even higher to as much as 2.0:1.

Aggregate Selection and Handling

Aggregates are inert granular materials such as sand, gravel, or crushed stone whether normal weight and/or lightweight that, along with water and portland cement and other cementitious materials and other optional raw materials such as pigment and/or admixtures, are used in concrete. The term "aggregate" as used herein can include ASTM International C 33 fine aggregates, ASTM International C 33 coarse aggregates, and other particulate materials mixed into a concrete mixture. "Fine aggregate" as the term is used herein means any particulate material used in zero slump to near zero slump concrete having a largest particle diameter of 0.344 inches (9.5 mm). As sold, mixtures including fine aggregate can consist essentially of particles that can pass through a 5/16-inch sieve. "Coarse aggregate" as the term is used herein means any particulate material used in zero slump to near zero slump concrete having particle diameters—between 3/8 in (9.5 mm) and approximately 0.012 inches (0.3 mm). There are allowances for minor percentages such as 5% or less of particles to be smaller than 0.012 inches. In some embodiments, mixtures comprising coarse aggregate used in methods provided herein can consist essentially of coarse aggregate having a largest particle diameter of 3/8 inch and all particles between 3/8 and 1/64 inches in diameter. In some cases, the fine aggregate and coarse aggregate used in concrete mixing process provided herein can comply with the ASTM International Standard C 331 active on Jan. 1, 2015.

Optionally, aggregate can be cleaned prior to use. In some cases, aggregate used in methods provided herein can be free of absorbed chemicals or coatings of clay, organics, and other fine materials that could cause the deterioration of concrete.

In particular embodiments described herein, the aggregates can account for at least 85 percent of the volume of a concrete mixture such as in the case of low density, lightweight aggregates. In some cases, fine aggregates used in methods provided herein can consist of natural sand or crushed stone.

Additionally or alternatively, coarse aggregate may be used in methods provided herein and may include gravel. In some cases, coarse aggregate used in methods provided herein can include at least 50 weight percent gravel. In some cases, coarse aggregate used in methods provided herein can consist of a mixture of gravel and crushed stone.

Aggregate can be mined using any suitable method. In some cases, aggregate can include gravel and sand dug or dredged from a pit, river, lake, or seabed. In some cases, crushed aggregate is produced by crushing quarry rock, boulders, cobbles, or large-size gravel. Recycled concrete is a viable source of aggregate and has been satisfactorily used in granular subbases, soil-cement, and in new concrete. The aggregate can be processed: crushed, screened, and washed to obtain proper cleanliness and gradation. In some cases, a beneficiation process such as jigging or heavy media separation can be used to upgrade the quality. Once processed, the aggregates can be handled and stored to minimize segregation and degradation and prevent contamination and to also protect from the weather as well as to allow to drain away and/or evaporate moisture.

In accordance with some embodiments, a selected ratio of fine aggregate and coarse aggregate can be used in processes provided herein. In some cases, concrete produced in methods provided herein include only fine aggregates. In other cases, concrete products produced in methods provided herein can include only coarse aggregates. In still other cases, concrete products produced in methods provided herein can include a ratio of fine to coarse in a range between 100:1 and 1:100. In one example, the concrete products produced using the methods described herein can include 2/3 fine aggregate to about 1/3 coarse aggregate by weight (mass).

In some cases, aggregates used in processes provided herein are selected based on overall mix chemical balance, resistance to comminution, mass flow including into molds, cost, color, corrosion resistance such corrosion resistance as from salts and/or sulfates, density, efflorescence resistance, as well as cementitious alkaline complex support and/or compatibility. In some cases, processes provided herein can use calcium-based aggregates. In some cases, aggregates used in processes provided herein are cementitious-reactive aggregates such as limestone, travertine, marble, aragonite, marl, coquina, coral, diatomaceous earth, chert, dolomite, pumice or scoria, slag or fly-ash, natural ash, pozzolanic, quartzitic, silicic, or manufactured lightweight-based aggregates and/or recycled content with a high percentage of fines passing through a 100 sieve.

Optionally, granulated coal ash, lightweight aggregates, and/or volcanic cinders are used instead of sand and gravel in whole or in part, the resulting block is commonly called a cinder block. This produces a gray block with a medium-to-coarse surface texture, good strength, good sound-deadening properties, and a higher thermal insulating value than a normal weight density concrete block.

Alternatively, the sand and gravel can be partially or fully replaced with expanded clay, shale, or slate. Expanded clay, shale, and slate are produced by crushing the raw materials and heating them to about 2000° F. (1093° C.). At this temperature the material bloats, or puffs up, because of the rapid generation of gases caused by the combustion of small quantities of organic material trapped inside, to produce a lighter block typically used in load-bearing or non-load-bearing walls and partitions. Expanded blast furnace slag, as well as natural volcanic materials such as pumice and scoria, can also be used to make medium-weight to lightweight blocks.

In addition to the aforementioned components, the concrete mixture made according to methods provided herein can also contain various chemicals, sometimes referred to as admixtures, to alter curing time, increase compressive strength, reduce efflorescence, affect swipe, repel moisture, and/or improve workability. Concrete mixtures provided herein may have pigments added to give the blocks a uniform, blended, or variegated color throughout, or the surface of the blocks may be coated with a baked-on glaze to give a decorative effect or to provide protection against chemical attack. The glazes can be made with a thermosetting resinous binder, silica sand, acrylics, and/or color pigments. Post applied sealers may also assist moisture control or aesthetic enhancement.

Cementitious

The concrete mix designs described herein can include a cement. In some cases, the cement is a portland cement. In some cases, the cement used in processes provided herein can be portland cement produced by heating sources of lime, iron, silica, and alumina to clinkering temperature (e.g., between 2,500 and 3,000° F., and in some cases greater than 3,000° F.) in a rotating kiln, then grinding the resulting clinker to a fine powder. The heating that occurs in the kiln can transform the raw materials into new chemical compounds. Finely ground blast furnace slag, fly ash, certain aggregate fines, pozzolanic fines, silica fume, diatomites, fine siliceous material, clays, and/or metakaolin, and/or other fine materials such as calcium sulfates and/or calcium carbonates may be used.

Raw Material Selection, Handling and Dispensing

In a number of embodiments described here, the raw materials for the concrete mix design can be selected, handled, protected, drained, evaporated, and subsequently dispensed into a mixer apparatus. In some cases, the raw materials (e.g., cement, cementitious fines, additives, and aggregate) are weather-protected. For example, raw materials can be stored in a low humidity environment, and preferably be stored at a temperature of at least 50° F. In some cases raw materials can be stored at temperatures of at least 20° F. Optionally, integrated moisture meters and/or temperature sensors can be included in material hoppers, silos, bins, and/or mixers. Also, the dispenser(s) controlling the dispensation of raw materials can execute computer-readable software that selectively sequences the dispensing of raw materials into a mixer. Accordingly, in these embodiments, the sand and gravel are protected to control a water content in the aggregates, rather than storing the sand and gravel outside in piles (exposed to precipitation and other moisture in an unprotected condition) and then transferring the unprotected sand and gravel into storage bins, holding hoppers, and/or silos in the plant by a conveyor belt or auguring devices as they are needed.

The cement (and particularly, the portland cement in preferred embodiments) used in methods provided herein can also be stored in a protected environment preserving its integrity so as to further control the hydration of the cement and additionally produce paste.

In methods provided herein, required amounts of aggregate and cement can be transferred by gravity and/or by mechanical means to a weigh batcher and/or volumetrically which measures the proper amounts of each material. In some cases, raw materials, fine aggregate, and course aggregate are stored and measured separately.

Mixing

Figure 2:
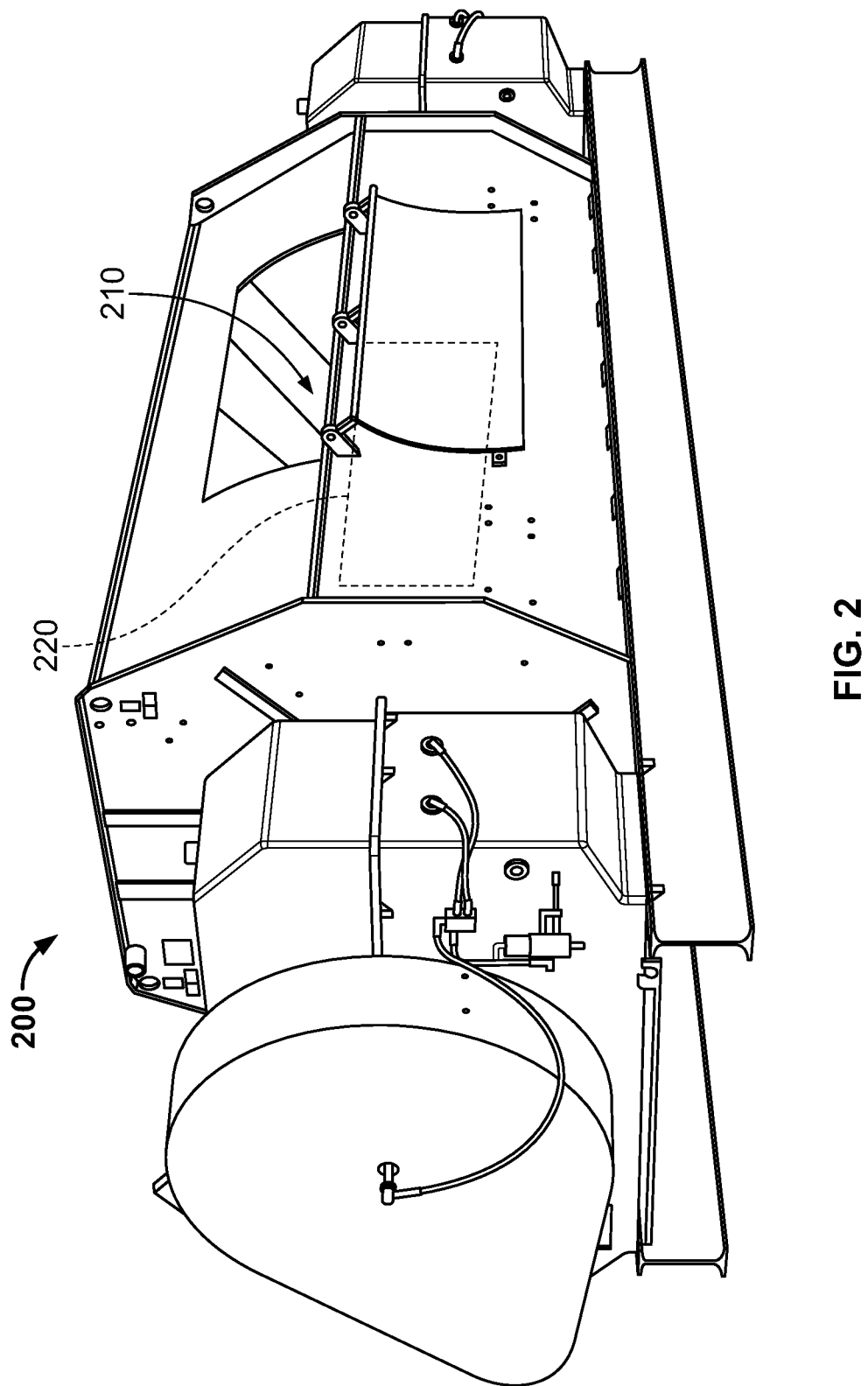
FIG. 2 a perspective view of a concrete mixing apparatus for a concrete mixture of the concrete product described in connection with FIG. 1.

Referring to FIG. 2, some embodiments of a concrete mixing apparatus 200 provided herein can include shearing elements 220 arranged inside a mixing chamber 210. For example, the mixing apparatus 200 can include liners, arms, and blades that are augmented to include protrusions or otherwise enhanced with shearing elements. Shearing elements can improve the mixing of the mixer in methods provided herein to provide a mixing of cementitious materials and water to produce a cementitious gel within a paste, inclusive of aggregates and optional admixtures and/or other raw materials as discussed below.

Figure 3:
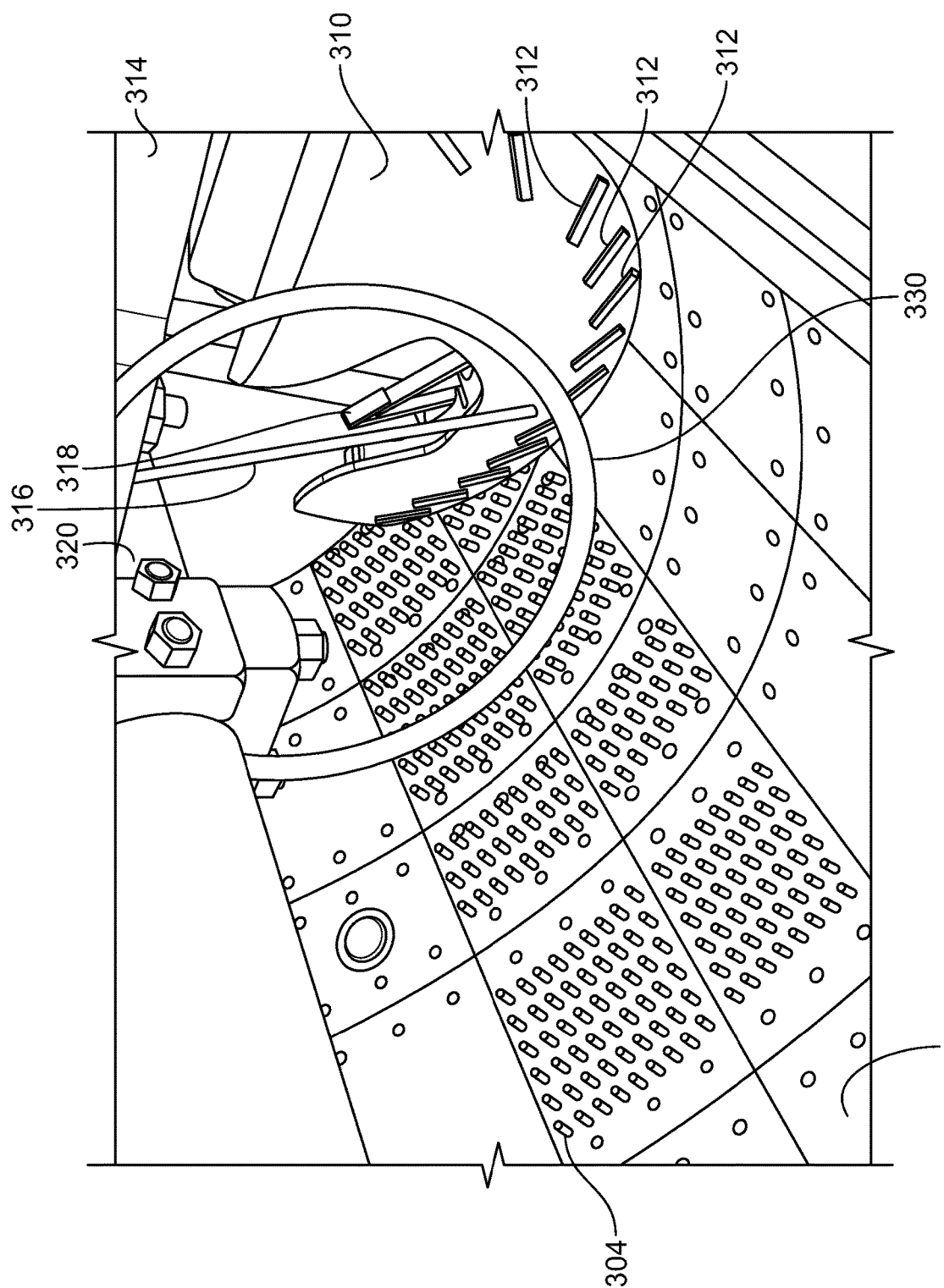
FIG. 3 a perspective view of a concrete mixing chamber (having shearing elements) of the concrete mixing apparatus of FIG. 2.

Referring to FIG. 3, in one example of the concrete mixing chamber 210 having shearing elements, a mixing drum has an inner surface 302 having texture or shearing projections 304. A vertical shaft 320 includes at least one mixing blade 310. The surface of the mixing blade includes shearing elements 312 projecting out of the surface of mixing blade 310. Mixing blade 310 is attached to a vertical rotating shaft 320 inside the mixer by a connecting arm 314. A cleaning and shearing ring 330 is positioned around shaft 320 such that it can intermittently contact shearing elements 312, and/or one or more shearing bars 318 and 318 bars which can cause cleaning and shearing ring(s) 330 to rotate and/or twist relative to shaft 320. The twisting and rotating of cleaning and shearing ring(s) 330 during mixing of a cement mixer can increase the shear forces experienced by the cementitious particles, aggregates, globules, flocs, agglomerated materials, and paste.

Figure 4:
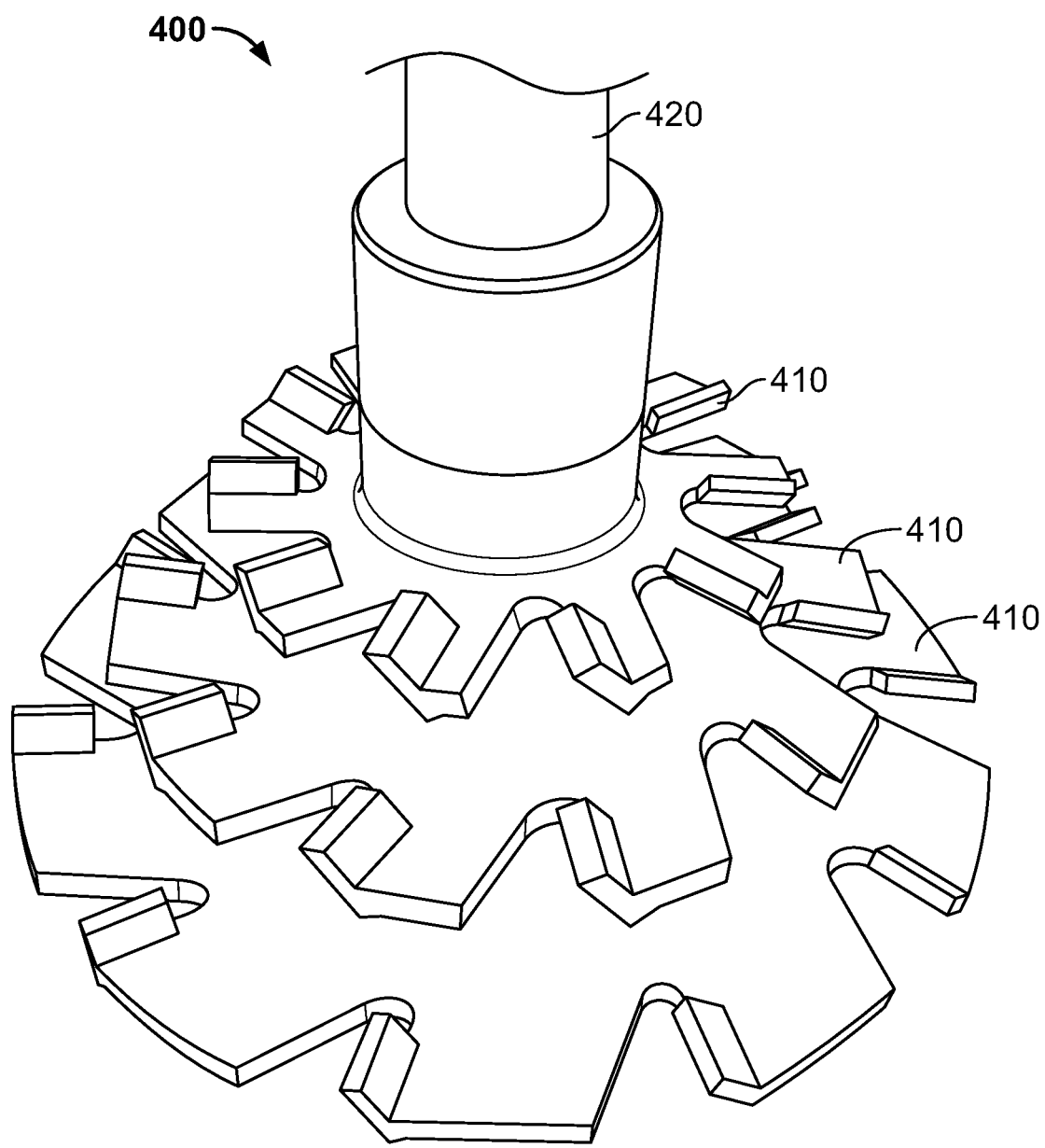
FIG. 4 depicts an example of an additional shearing rotor for use in a pre-mixer apparatus prior to transferring the aggregates to the concrete mixing apparatus of FIG. 2.

Referring to FIG. 4, in some embodiments, some or all of the initial portion of the aggregates, water, an optional materials can be subjected to a an augmented shearing process using, for example, a shearing rotor 400 that rotates within a pre-mixing apparatus before the materials are transferred into the mixing apparatus 200. The shearing rotor 400 can be configured within the pre-mixing apparatus to generate mixing operations that are more turbulent with aggressive shear action rather than just traditional gentle movement and surficial hydration. In this embodiment, the shearing rotor 400 includes multiple, adjustable, invertible, removable mixing impellers each comprised of multiple, differently sized, wear-resistant blades 410 positioned on a shaft 420, which can be used in methods provided herein to make concrete products provided herein.

In some embodiments, including those embodiments described in connection with FIGS. 1-4, the shearing elements, which may include projections (e.g., "teeth") and/or bars, biased extensions, and welded textures are provided within the mixing chamber 210 (or within a pre-mixing apparatus) to physically shred cementitious particles, aggregates, globules, flocs, agglomerated materials, and paste when mixing any of the various concrete components such as aggregate, cement, additivies, optional admixtures and/or other raw materials, and water. Shearing elements can allow for mixing operations that are more turbulent with aggressive shear action rather than just traditional gentle movement and surficial hydration. In some cases, processes provided herein can overcome chemical, mechanical, ferromagnetic and/or static cohesive forces of the cementitious to produce a cementitious gel within the paste prior to adding all of the aggregate. Aggregates are known to also contribute to the chemical, mechanical, ferromagnetic and/or static cohesive forces involved which also must be overcome.

In some embodiments, the mixing apparatus 200 can be operated at a temperature elevated above ambient temperatures. For example, the mixing chamber 210 of the mixer 200 can be pre-heated and/or insulated. The insulated mixer 200 can preserve heat from prior batches in part or in whole, as some of the chemical reactions are exothermic such as hydration. In some cases, drier and/or warmer materials allows the mix to momentarily increase the liquid volume simultaneous to more reactive liquid, pushing the cementitious hydration and multiple chemical reactions far further than otherwise possible, and thus additionally contributing toward the benefits of 100%+ water (described above).

The embodiments of mixers provided herein (including the example mixer 200 described in connection with FIGS. 2-4) can include water spray bars designed to both deliver and diffuse the water delivered to the mixer in a distinctly rapid manner. In some cases, water spray bars can deliver all of the water needed for a concrete mixture within 10 seconds, or less. The plumbing of the water dispensing equipment can include upgraded and larger capacity plumbing and fittings, filters, checkvalves, manual or solenoid shut-off valves, flow sensors, larger diameter spray bars with greatly enhanced distribution holes, pressurized water tank(s), and/or accumulator(s), each operating either at delivered water pressure or higher water or pneumatic pressure.

Referring again to FIG. 1, in the example method 100 the concrete mixture designs and the methods provided herein can include an initial stage 109 that achieves a non-cementitious, water-based slurry. For example, the initial portion of the aggregates 101 (preferably the initial portion comprises a fine, protected, drained aggregate) is delivered into the mixer (such as the mixing apparatus 200 in FIG. 2) and water 103 is rapidly dispensed to mix with the initial portion of the aggregates 101 (the water 103 is optionally injected in an amount that is 100%+ water, as described above). For example, the amount of the protected aggregate delivered into the mixer at the initial stage 109 can be 85% or less by weight of the total aggregate for the batch (with the remaining portion being added at a later stage), more preferably 50% or less by weight of the total aggregate for the batch (again, with the remaining portion being added at a later stage), more preferably 5% to 40% by weight of the total aggregate (again, with the remaining portion being added at a later stage), and 5% to 30% by weight of the total aggregate this particular embodiment (again, with the remaining portion being added at a later stage). In some cases, the method 100 may also include delivering at least one optional admixture 104 into the mixing chamber. In some cases, the water 103 is sprayed to be combined with an optional admixture 107 in the mixer—each initiated within only a second or two of the other—while mixer blades/arms (refer to FIGS. 2-4) are in motion. Optionally, the delivery of the aggregates into the mixer is staged such that an initial portion of the overall aggregates to be delivered for a batch (e.g., fine aggregates, coarse aggregates, or combinations)

with the optional admixture are deposited into the mixing chamber prior to spraying the water. Optionally, the admixture is delivered by a high efficiency dispensing system. Optionally, the admixture 107 is delivered during or after the water 103 has been dispensed. In some cases, the protected aggregate 105 may be added at any time during or after the initial slurry 109 stage of mixing. In some cases, the sprayed water is heated. As described in more detail below, the water and optional admixture (and optionally aggregates) provide a highly reactive, well-diffused, warming, excessive liquid or slurry. Optionally, during the initial mixing stage 109, a second partial dispensation of the aggregate 105 (preferably protected, drained aggregate, either fine or coarse) may also be added into the mixing chamber. In some cases, the initial stage portion of the aggregates 101 (and optionally 105), the water 103, and optional admixture 107 are collectively mixed for about 30 seconds before the subsequent stage (e.g., before the cementitious material is added to the mixing chamber). For example, the initial stage portion of the aggregates 101 (and optionally 105), the water 103, and optional admixture 107 are mixed at a shear rate of at least 2.2 sec-1 to as much as 45 sec-1. In some cases of two stage mixing in which the optional additional aggregate 105 is implemented, shear rates can be a total of at least 2.2 sec-1 to 1850 sec-1. In some cases, the initial stage portion of the aggregates 101 (and optionally 105), the water 103, and optional admixture 107 are mixed with a mixing energy of between 30 horsepower (81 MJoule) to 150 horsepower (403 MJoule).

As previously described, the dispensation of these raw materials 101, 103, 105, and 107 can be computer-controlled using a weigh batcher apparatus. For example, as shown in FIG. 5, the weigh batcher apparatus 500 can be configured to electronically measure and then transfer the selected required amounts of aggregate and cementitious material into the mixing chamber.

Still referring to FIG. 1, during the initial mixing stage 109, the initial portion of the aggregates 101, the water 102, the optional admixture(s) 107, and the optional additional portion of the aggregates 105 are mixed in the mixer without adding cementitious material for the batch. In doing so, the mixing chamber provides a dispersed, reactive, non-cementitious slurry, in which the shearing elements of the mixer may provide deagglomerating, counter-ferromagnetic shear mixing. In other words, the slurry 111 at this initial mixing stage is therefore primed to chemically react more effectively in a dispersed, fluidized state, which may be further enhanced by mixer shear that assists this dispersion. Additionally, this example method 100 described herein can dispense water into the mixture so that "100%+ water" is incorporated into the mix at this initial stage 109 of the batch sequence and dispensed at a rapid pace. In particular, due to the advantageous mix design and batching methods described herein (which induce the concrete mixture to be more reactive and consume greater moisture amounts), the water demand of the mixture throughout the mixing stages is increased while still achieving a zero-slump to near-zero-slump concrete mix. The resulting non-cementitious slurry 111 is then ready to receive cementitious material at the subsequent stage of the method 100.

For example, the method 100 may include dispensing a predetermined amount of hydraulic cementitious material 113 into the mixing chamber carrying the non-cementitious slurry 111. Optionally, additional admixture or other material 115 can be added to the cementitious slurry at this mixing stage 117. In doing so, the mixing stage 117 combines the non-cementitious slurry 111 and cementitious material 113 configured to provide accelerated, dispersed, slumped, hydrating, hydraulic cementitious material, in which the shearing elements of the mixer may provide deflocculating, counter-ferromagnetic shear mixing. During the intermediate mixing stage 117, the components 111, 113, and (optionally) 115 are mixed to form a cementitious gel within the slurry. In some cases, the water and the cement can be mixed at a water to cementitious ratio of at least 0.4. In some cases, the water and the cement can be mixed at a water to cementitious ratio of less than 2.0. In some cases, the water and the cement can be mixed at a water to cementitious ratio of between 0.4 and 2.0. The ratio of the water to cementitious used in processes provided herein can be in excess of the water to cementitious ratios traditionally used in industry, as the method 100 provided herein can hydrate a larger percentage of the cement material when forming the cementitious gel within the slurry. As such, the increased reactions of the hydrated and byproducts can also manifest another level of efficiencies.

In some alternative embodiments, the optional materials 115 (FIG. 1) can be mixed with the non-cementitious slurry 111 before the full amount of the cementitious material 113 is added to the mixture. For example, the optional materials can include an admixture material, a minority portion of the cementitious material that operates as an "admixture" within the slurry 111, or both. In one such alternative embodiment, the optional materials 115 (comprising a minority portion of the cementitious material) are mixed together with the slurry 111 (without yet adding the full cementitious material 113) so as to achieves a non-cementitious, water-based slurry, yet inclusive of both aggregate fines along with a small amount of cementitious material. In some circumstances, the minority potion of the cement does not to act as a cementitious concrete binder for the slurry 111. For instance, in one optional example, the optional materials 115 (comprising a minority portion of the cementitious material that is less than 30% of cementitious material 113 for the total batch) may be added to the slurry 111 as an admixture so as to still produce a non-cementitious slurry that is not configured to provide a cementitious zero slump to near zero slump concrete strength as would otherwise be expected from cementitious material within tradition batching methods, but rather hydrating and further reacting so as to provide both "pre-treatment" moisture control as well as increased alkalinity simultaneously. The pre-treatment moisture control within the slurry 111 (prior to adding the adding the full cementitious material 113) comes in the form of a temporary thin paste coating over aggregates 101 which in turn regulates moisture and/or admixture of the slurry 109 being adsorbed too quickly into the aggregate 101 pores. At the same time the increased alkalinity following hydration and further reactions within the slurry 111 in turn acts both as a surfactant as well as an accelerator to subsequently added cementitious material 113 (e.g., in this embodiment, the remainder of the cementitious material that was not part in the initial minority portion) to be provided within intermediate mixing stage 117.

In other embodiments, the cementitious material 113 (in a full amount) and the optional materials 115 (e.g., admixtures, but not a necessarily any further cementitious material) can be generally simultaneously added into the slurry 111 at the intermediate mixing stage. In still other embodiments, the cementitious material 113 can be mixed with the non-cementitious slurry 111 before any of the optional materials (e.g., admixtures, or other additives) is added to the mixture.

Referring again to FIG. 1, during the intermediate mixing stage 117, the components 111, 113, and (optionally) 115 can be mixed for a selected period of time (preferably using the aforementioned shear mixing) to produce slumped, dispersed, accelerated, deflocculated, hydrating hydraulic cementitious mix 121. In some cases, the components 111, 113, and (optionally) 115 are mixed during intermediate stage 117 for at least 0.5 minutes. In some cases, the components 111, 113, and (optionally) 115 are mixed during intermediate stage 117 for up to 13 minutes. In some cases, t the components 111, 113, and (optionally) 115 are mixed during intermediate stage 117 intermittently for up to 35 minutes. In some cases, the components 111, 113, and (optionally) 115 are mixed during intermediate stage 117 for about 2 minutes. In some cases, the components 111, 113, and (optionally) 115 are mixed during intermediate stage 117 for about 0.5 minutes to about 13 minutes. In some cases, the components 111, 113, and (optionally) 115 are mixed during intermediate stage 117 at a shear rate of at least 2.2 $s^{-1}$. In some cases, the components 111, 113, and (optionally) 115 are mixed during intermediate stage 117 at a shear rate of between 2.2 $s^{-1}$ and 45 $s^{-1}$. In some cases of two stage mixing, shear rates can be a total of at least 2.2 sec-1 to 1850 sec-1. Concrete Shear Rate could be described as a ratio within time (seconds) of net horizontal movement (as an example in meters, left to right since gravity levels concrete during slow rotation) of concrete mass per second divided by the net length of the displaced concrete mass such as at the end of the blade and tangent to the inside radius of the mixer (in meters, from the perpendicular of the center or rotation or shaft and then tangent to drum or mixer blade rotation; relative shearing), using a shear rate formula $$\dot{\gamma}_c = \frac{\left(\frac{\delta}{t}\right)}{y} = \frac{\text{relative velocity}}{\text{thickness of the sheared concrete}}.$$

Although shear rates of around 18 $s^{-1}$ can be used in ready-mixed concretes (described above), near-zero-slump and zero-slump concrete (less than 1 inch, often less) will have much lower shear rates. For example, traditional near-zero-slump concrete is estimated to have the following values: (0.36 m×2=0.72 m/sec relative velocity)/(0.13 m)=5.54/sec and further reduced given the weakened gravitational effects of the near zero slumped condition by an estimated 60% due to the agglomerated concrete particle form; (0.40)×(5.54/sec)=effective shear rate of 2.22 sec-1. Increasing shear in a near-zero-slump concrete or zero-slump concrete over the typically shear can overcome the cohesive forces (including ferromagnetic cohesive forces) thwarting efficient shear and mixing and therefore to result in greater hydration and chemical reactions, which can result in more competitive manufacturing cost, less aesthetic efflorescence, and greater durability while maintaining a baseline strength. The concrete mix design and methods provided herein can provide increased shear that can result in increased water demand (water/cement ratio) from 0.1% increase to 350% increase or more, lowered cement to aggregate ratios reducing that ratio from an industry average of approximately 12.4% to 11.2% and as low as 5% or lower, and ambient carbon dioxide sequestration (after subtracting the contribution of the raw materials) of approximately 5% to 13% or more weight percent of the cement within the first 28 days of unit formation.

As discussed above, employing additional shearing elements along surfaces of the mixer can increase the shear rate. In some cases, as discussed above, teeth or projections can be added to mixing blades and/or an inside surface of a mixing drum. For example, surface welding with high nickel % welding rod, surface-welded pieces, or alternate factory-made parts containing highly durable metal can attached throughout one or more of seven distinct mixer surfaces:
- the helix blades front (sliding or mixing) surfaces or alternately the shoes of pan mixers, rotating pan mixers, or of countercurrent mixers, and/or
- the adjacent (to the liners) surfaces of the helix blades or alternately the shoes of pan mixers, rotating pan mixers, or of countercurrent mixers, and/or
- the mixer liners or walls themselves
- the top or interior-facing surfaces of the helix blades surfaces or alternately the shoes of pan mixers, rotating pan mixers, or of countercurrent mixers, and/or
- protrusions of the helix blades (sliding or mixing) surfaces or alternately the shoes of pan mixers, rotating pan mixers, or of countercurrent mixers, and/or
- the arms connecting the helix blades or alternately the shoes of pan mixers, rotating pan mixers, or of countercurrent mixers, and/or
- the addition of additional helix blades in part or in whole or alternately the shoes of pan mixers in part or in whole, rotating pan mixers in part or in whole or of countercurrent mixers in part or in whole.

Furthermore, for example, by staging the mix sequence (as shown by way of example in FIG. 1) so that only an initial portion of the aggregates (preferably less than 50% of the overall batch amount) is mixed with 100%+ water at the initial mixing stage 109, thereby preparing the non-cementitious slurry 111 to mix with the cementitious material 113 (and mixed with the optional certain hydration-increasing, and/or accelerating-inducing, and/or anti-flocculating admixtures), the effective shear rate becomes multiplied. In doing so, the shear rate for the approximately 1-3 minute mixing stage 117 can, in some examples, far exceed that of slumped concrete because of the many additional shear planes equipped into the mixer. For each additional shear plane included in the mixer, the shear rate can be increased by approximately one magnitude during this mixing stage 117 of the total mixing sequence:
1. additional mixing plane: (5.54 sec-1)×(100%+100%=200%)=11.1 sec-1 approximately
2. additional mixing planes: (5.54 sec-1)×(100%+100%+100%=300%)=16.6 sec-1 approximately
3. additional mixing planes: (5.54 sec-1)×(100%+100%+100%+100%=400%)=22.2 sec-1 approximately
4. additional mixing planes: (5.54 sec-1)×(100%+100%+100%+100%+100%=500%)=27.7 sec-1 approximately
5. additional mixing planes: (5.54 sec-1)×(100%+100%+100%+100%+100%+100%=600%)=33.2 sec-1 approximately
6. additional mixing planes: (5.54 sec-1)×(100%+100%+100%+100%+100%+100%+100%=700%)=38.8 sec-1 approximately
7. additional mixing planes: (5.54 sec-1)×(100%+100%+100%+100%+100%+100%+100%+100%=800%)=44.3 sec-1 approximately
etc.

In some cases, after the initial mixing stage 109 and intermediate mixing stage 117, the rest of the mixing sequence for zero slump to near zero slump concrete may no longer be limited due to the agglomerated particle form by approximately 60% when compared to mixing slumped concrete, and rather only by an estimated 40% or less. Therefore, as an example, if essentially 5 planes are added within a mixer with an initial mixing period of 2 minutes out of a total mixing sequence of approximately 6½ minutes or less, the shear rate for the total mixing sequence would more nearly approximate:

$$((2/6.5=0.31)\times(33.2 \text{ sec-1})=10.22 \text{ sec-1})+((4.5/6.6=0.69)\times(0.60\times5.54 \text{ sec-1}=3.32 \text{ sec-1})=2.29 \text{ sec-1})=12.51 \text{ sec-1}$$

In some implementations, synergistic effects from methods provided herein can provide an increase in the total batch size which in turn allows longer mixing periods, by up to 40% or more. By increasing the time of mixing while incorporating the additional shear rate offered by these improvements, the net effective shear rate in some cases would be: $(1.00+0.40=1.4)\times(12.51 \text{ sec-1})=17.51 \text{ sec-1}$, which is approximating the effective average shear rate expected from slumped concrete.

Referring again to FIG. 1, the intermediate mixing stage 117 causes the components 111, 113, and (optionally) 115 to be mixed for a selected period of time (preferably using the aforementioned shear mixing) to thereby result in a slumped, dispersed, accelerated, deflocculated, hydrating hydraulic cementitious mix 121. In this example, the present state of the batch in the mixing chamber includes all of the batch amount of the cement, all of the batch amount of the water (in particular, the 100%+ water as previously described), but less than all of the batch amount of the aggregates (because only a portion of the overall, predetermined batch amount of the aggregates was deposited in the mixing chamber and subjected to the initial mixing stage 109 and the intermediate mixing stage 117). Due to some or all of these conditions, the cementitious material 113 added at the intermediate mixing stage 117 can be more thoroughly and more quickly hydrated. Also, the increased shear during mixing can additionally cause hydrated cementitious material to be separated from less hydrated or dry cementitious particles to promote further hydration of the cementitious to create a greater amount of cementitious gel within the paste within the mixing chamber. Accordingly the concrete mix design and the methods provided herein can increase the hydration of the cementitious material in each batch and can thus increase the ratio of water used in mixing zero slump to near zero slump concrete (refer to the previous description of using 100%+ water).

Turning to the third mixing stage 127 depicted in FIG. 1, the remainder portion 123 of the overall, predetermined batch amount of the aggregates is then added to the mixing chamber so as to mix with the cementitious mix 121 resulting from the intermediate mixing stage 117. In doing so, the mix transitions to a stiffer consistency. Preferably, the remaining aggregates 123 are protected aggregates, as previously described herein. As previously described, the dispensation of the remaining aggregates 123 can be computer-controlled using the weigh batcher apparatus (refer, for example, to FIG. 5), which is configured to electronically measure and then transfer the selected amounts of the protected aggregate into the mixing chamber. During the third mixing stage 127, the components 121 and 123 can be mixed for a selected period of time (preferably using the aforementioned shear mixing) so that the cementitious mix 121 (resulting from the intermediate mixing stage 117) thoroughly coats the remainder portion 123 of the overall, predetermined batch amount of the aggregates. As previously described, this mixing stage 127 employs the shearing elements of the mixer so as to provide deflocculating, counter-ferromagnetic shear mixing. In some cases, the components 121 and 123 are mixed during third stage 127 for about 0.5 minutes to about 13 minutes, and preferably about 0.5 minutes in this example. In some cases, the components 121 and 123 are are mixed at a shear rate of at least 2.2 s-1. In some cases, the components 121 and 123 are are mixed with a mixing energy of between 30 horsepower (81 MJoule) to 150 horsepower (403 MJoule).

During the third mixing stage 127, the concrete mixture also intakes atmospheric carbon dioxide 125 due to the ongoing chemical reactions of the cementitious material and other components of the mixture, as described above. Because the carbon dioxide is beginning to be sequestered at a more significant volume and/or pace (for reasons described above), the sequestration of the carbon dioxide resulting from the concrete mix design and methods described herein can provide significant environment benefits, including the reduction of environment greenhouse gases as compared to many traditional concrete mixing and batching methods.

Still referring to FIG. 1, when remaining aggregate 123 is added to the mixer during the third mixing stage 127, the hydration and other reactions in the cement are already well underway throughout the cementitious mix 121 (resulting from the intermediate mixing stage 117). Unlike various tradition mixing operations where all (or a vast majority) of the overall batch aggregates are initially and simultaneously mixed with the water and cement (thereby causing the hydration and other reactions of the cement to primarily occur at the surfaces of the agglomerated masses), the depicted method in the example of FIG. 1 reserves the remaining portion of the aggregates 123 (e.g., the majority of the overall predetermined batch amount) until the third mixing stage 127 after the initial mixing stage 109 and intermediate mixing stage 117. Preferably, during the third mixing stage, the remaining aggregates 123 are protected (as described above) and, thus, relatively dry so as to more readily absorb excess liquid from high-slump cementitious mix 121 (resulting from the intermediate mixing stage 117) so as to bring the concrete mixture back into rheological equilibrium and near zero slump. In some cases, the remainder portion 123 of the overall, predetermined batch amount of the aggregates include less than 10 weight percent moisture, preferably less than 5 weight percent moisture, more preferably less than 3 weight percent moisture, and less than 1 weight percent moisture in this particular example. As a result of the third mixing stage 127, the mixture in the mixing chamber transitions from the aforementioned slumped, dispersed, cementitious mix 121 to a hydrating, near-zero-slump, high-water-demand concrete mix 131. Accordingly, the staged mixing as described in this example method 100 can advantageously add the cementitious raw materials (e.g., component 113) into the mixer at a stage (e.g., the intermediate stage 117) so that the cementitious raw materials advantageously receives valuable exposure to a significantly high percentage of moisture when it is first introduced and when the slurry is more reactive to cement and/or moisture, and then the remainder portion 123 of the overall, predetermined batch amount of the aggregates is subsequently added (as well a minor amount of atmospheric $CO_2$ 125 being absorbed) during the third stage 127—all of which can be accomplished under the conditions of shear mixing (described above) to further enhance the mixture.

Still referring to FIG. 1, after the third stage 127 achieves the hydrating, near-zero-slump, high-water-demand concrete mix 131, a fourth mixing stage 137 can be implemented so as to achieve the targeted zero-slump or near-zero-slump concrete mix. In this example, the fourth mixing stage 137 may optionally include the addition of admixtures or other additives 133, and furthermore the mixture again intakes atmospheric carbon dioxide 135 due to the ongoing chemical reactions of the cementitious material and other components of the mixture, as described above. Optional additives 133 can include one or more pigments, water repellent mortar, or other additives. In some cases, the optional additives 133 can be mixed with the concrete mix 131 for a selected period of times so as to provide a non-corrosive accelerated concrete mix that transitions to a zero-slump or near-zero-slump state. Because the cement is more fully hydrated using methods provided herein, methods provided herein can reduce an amount of pigment needed in a concrete product because processes provided herein can reduce the eventual amount of reactions between otherwise non-hydrated cement and pigment later observed as efflorescence coating as one example, which can improve observed unit color stability. As previously described, this mixing stage 137 employs the shearing elements of the mixer so as to provide deflocculating, counter-ferromagnetic shear mixing. In some cases, the components 131 and 133 are mixed during fourth stage 137 for about 0.5 minutes to about 13 minutes, preferably about 1 minute to about 2 minutes, and about 1 minute in this example.

Accordingly, the method 100 in this example can employ the different stages 109, 117, 127, and 137 of mixing so as to defer the dispensation/intermixing of the majority of the aggregates (and, optionally, all of the pigments, integral water repellents and other additives) until after the initial mixing of cement with the water (e.g., 100%+ water in particular implementations) and a minority (initial) portion of the aggregates, which may serve to accentuate the cementitious chemical reactions of hydration, gel and paste formation, calcium hydroxide generation, secondary and subsequent reactions, along with exothermic energy. In some cases, the method 100 provided herein can form a cementitious mixture (e.g., component 121 at the intermediate mixing stage 117) with the aggregates in the mixture being less than 85% by weight of the predetermined overall batch amount of the aggregates, less than 70% by weight of the predetermined overall batch amount of the aggregates, more preferably less than 50% by weight of the predetermined overall batch amount of the aggregates, preferably less than 40 by weight of the predetermined overall batch amount of the aggregates, more preferably less than 30% by weight of the predetermined overall batch amount of the aggregates, more preferably less than 20% by weight of the predetermined overall batch amount of the aggregates, and in this embodiment, less than 10% by weight of the predetermined overall batch amount of the aggregates.

Still referring to FIG. 1, after the fourth mixing stage 137, the zero-slump or near-zero-slump concrete mix is discharged and conveyed 141 from the mixer (e.g., mixing apparatus 200) for molding 143 into "green units" (described above). Such a molding operation can be performed, for example, by a mold apparatus configured to form the concrete mix into green units having a predetermined shape for a selected CMU (e.g., such as a concrete block). For example, FIG. 6 depicts an embodiment of a mold apparatus 600 that receives the zero-slump or near-zero-slump concrete mix conveyed from the mixing apparatus 200. The mold apparatus 600 in this embodiment includes an input hopper 610 to receive the zero-slump to near-zero-slump concrete mix from a conveyor, which then directs the concrete mix unit a mold box 620 that compresses, heats, vibrates or otherwise forms the shape of the green units 640 and outputs while on a pallet them to a conveyor 630. Because the concrete mixture that is initially delivered into the mold box 620 is a zero-slump to near-zero-slump concrete mix, the concrete may be retained in the molds of the mold chamber 620 for only about less than 20 second and preferably about 6-20 seconds, which can be sufficient for the newly formed units 640 to maintain their respective shape on the conveyor 630 and through the subsequent operations in method 100 (even though the concrete units are not fully cured or hardened).

Optionally, the method 100 may be implemented in a manner such that the discharge temperature of the zero-slump to near-zero-slump concrete mixture is monitored. For example, the mixing apparatus 200 or other conveyance instrument for handling the concrete mix can monitor the discharge temperature to the nearest 0.1° F. with contact or probe thermometer. Also, the method 100 may be implemented in a manner such that the moisture levels within the mixing chamber are monitored. For example, the mixing apparatus 200 can monitor moisture to within the nearest 0.5 quart, using for instance, measurement of the conductivity/resistance infra-red, or microwave reaction energy of the contents of the mix before, during, or after the fourth mixing stage 137.

Still referring to FIG. 1, after molding the green units 143, the concrete units are then conveyed and subjected to a curing process in operations 151 and 155. In particular embodiments, the green units can be conveyed to a curing chamber that is configured to exposes the concrete units to a predetermined temperature, moisture condition, and carbon dioxide atmospheric and carbon dioxide supplement level. For example, FIG. 7 depicts an embodiment of a curing apparatus 700 having a curing chamber 710 configured to receive a plurality of the green units 640. The curing chamber 710 can be sealed, and is equipped with one or more heat sources, temperature monitors, and input ducts to deliver moisture vapor into the chamber 710. In some implementations, the curing chamber 710 is configured to immerse the green units in a suspended fog condition so as to achieve the selected moisture condition. For example, the curing chamber 710 can receive a high-pressure generated suspended fog initially at ambient temperatures to stabilize the newly formed units during curing chamber charging. In some preferred embodiments, such fog particles average less than 25 microns in diameter, more often approximating an average of 15 to 20 microns, are circulatable, and are therefore distinctly different than traditional "mist" used in some traditional curing operations. In some optional implementations, the curing chamber can advantageously offset the otherwise traditional method of using a "preset" stage of up to 5 hours during the curing process, by instead immersing the green units in the high-pressure suspended fog to accelerate the curing the green units while reducing surface drying. Moreover, during the curing process, a significant amount of carbon dioxide is depleted from the chamber 710 due to the ongoing chemical reactions in the concrete units which therefore absorb available carbon dioxide. The curing apparatus 700 can advantageously redirect some or all of the carbon dioxide being exhausted from the heat source (e.g, from a locally positioned steam boiler, vapor generator, burner, or the like combustion source) into the curing chamber 710 according to a series of intermittent, short cycles to thereby replenish the carbon dioxide into the curing chamber 710 and restore approximate equilibrium levels. In some preferred embodiments, these advantages are performed not relying upon hot gases which are lower in solubility of carbon dioxide, but rather at ambient temperatures, thus more efficiently because each fog particle can carry a higher percent carbon dioxide. As such, the method 100 can provide environmental benefits by further reducing the carbon dioxide that would otherwise remain in the environment.

Optionally, the curing operations 151 and 155 may be implemented in a manner that provides a number of other benefits. In one example, the curing chamber can maintain the green units in a sufficiently preconditioned atmosphere so as to reduce the likelihood of surface drying. For instance, the previously described high-pressure generated suspended fog generated at the curing chamber can produce average fog particle smaller than approximately 25 microns so as to resemble natural fog in that a major portion of the generated fog suspends in the air rather than immediately succumbing to gravity and falling downward in ambient conditions. Further, in some implementations, the curing treatment that uses the high-pressure generated suspended fog may not be dependent upon heat, which can reduce the likelihood of condensation forming upon cooler surfaces of the green units (and thus reducing the likelihood of excessively wet results as well as waste onto any surface). Additionally, in some implementations, the amount of energy needed for circulation may be significantly reduced, for example, by relying upon less than ½ total HP per approximately 10,000 units within a curing chamber as one example. Also, in some implementations, the curing chamber may use a full 3 axis array of temperature sensors, which when coupled with conditions of the previously described high-pressure generated suspended fog, causes the curing chamber to reach a substantially uniform atmospheric temperature equilibrium (within 2° F.) top-to-bottom, across, and sideways in less than 60 seconds (preferably less than 15 seconds), including fog circulation.

Optionally, the curing treatment that uses the high-pressure generated suspended fog may incorporate alternating circulation and/or intermittent convection cycling several times an hour, including at least 2 times per hour, though as many as 8 cycles or more per hour (e.g., implemented, for example, using a fan or other components that circulates the variable ambient atmospheres within a curing chamber). Such alternation may be beneficial in some circumstances because the desired conditions are able to access to somewhat confined or tight areas between and among units. Also, the curing treatment that uses the high-pressure, suspended fog may not only contain ambient carbon dioxide, but may also provide the benefit of generally uniformly presenting the carbon dioxide to all exposed surfaces of the units. Additionally, the fog particles themselves may also assist in the absorption of the ambient carbon dioxide, which can in some case significantly increase the net amount of carbon dioxide available to the surfaces of the green units as they are curing.

Optionally, the curing chamber can control one or more sources of heat to provide, on a controlled, gradual, and circulated basis cyclical temperate rises. For example, the cyclical temperature rises may elevate to a maximum of 20° F. per hour thus reducing thermal shock to the units.

Still referring to FIG. 1, after concrete units exit the curing chamber, the method 100 may further include operations to re-palletize and transport 161 the now-hardened concrete units to a storage site, whereat the now-hardened concrete units can continue to undergo subsequent curing 165 over time. For example, FIGS. 8-9 illustrates an example of a cubing station 800 configured to palletize the hardened concrete products 900. The method 100 (FIG. 1) further illustrates that an increased level of carbon dioxide sequestration 163 can be achieved even after the hardened concrete units exit the curing chamber. In particular, the improvements described herein may provide a measurable increase in carbon dioxide percent sequestration relative to the amount of cement used for a given batch. In some embodiments, the hardened concrete units 900 can continue to absorb and sequester the environmental carbon dioxide to a greater level and, optionally, at a greater rate as compared to ordinary concrete units formed according to traditional batching and mixing methods. For example, according to some implementations of the method 100 depicted in FIG. 1, the improved environmental benefits such as carbon dioxide sequestration are poised to increase by the end of 28 days after exiting the curing chamber. Thus the sequestration of the carbon dioxide resulting from particular implementations of the concrete mix design and methods described herein can provide significant environment benefits, including the reduction of environment greenhouse gases as compared to many traditional concrete mixing and batching methods.

A number of embodiments of the invention have been described. Nevertheless, it will be understood that various modifications may be made without departing from the scope of the invention. Accordingly, other embodiments are within the scope of the following claims.

What is claimed is:

1. A concrete product formed from a zero-slump to near-zero-slump concrete mixture and configured to sequester greenhouse gasses, comprising:
   a green unit comprising a zero-slump to near-zero-slump concrete mixture and having a molded predetermined shape of a concrete masonry unit,
   wherein the green unit sequesters ambient carbon dioxide over a period of time as it is cured and hardened so that the concrete product sequesters carbon of at least 5% weight percent of the cement over a 28 day period, and
   wherein the zero-slump to near-zero-slump concrete mixture consists of aggregates, pigment, water repellent admixture, cement, and a predetermined amount of water in an amount of 100%+ water.

2. The concrete product of claim 1, wherein the zero-slump to near-zero-slump concrete mixture of the green unit maintains said molded predetermined shape of the concrete masonry unit from being retained in a mold for less than about 20 seconds.

3. The concrete product of claim 2, wherein the zero-slump to near-zero-slump concrete mixture of the green unit maintains said molded predetermined shape of the concrete masonry unit from being retained in the mold for no greater than 6 to 20 seconds.

4. The concrete product of claim 1, wherein the zero-slump to near-zero-slump concrete mixture comprises both fine aggregates and coarse aggregates in a ratio of fine aggregate to coarse aggregate in a range between 100:1 and 1:100.

5. The concrete product of claim 1, wherein the zero-slump to near-zero-slump concrete mixture comprises both fine aggregates and coarse aggregates in a ratio of fine aggregate to coarse aggregate of 2:1.

6. A concrete product formed from a zero-slump to near-zero-slump concrete mixture and configured to sequester greenhouse gasses, comprising:
   a green unit comprising a zero-slump to near-zero-slump concrete mixture and having a molded predetermined shape of a concrete masonry unit,
   wherein the green unit sequesters ambient carbon dioxide over a period of time as it is cured and hardened so that the concrete product sequesters carbon of at least 5% weight percent of the cement over a 28 day period, wherein the zero-slump to near-zero-slump concrete mixture consists of aggregates in amount that is at least 85 percent of a total volume of said mixture, cement, water, and optionally pigment and/or water repellent admixture.

7. The concrete product of claim 6, wherein the zero-slump to near-zero-slump concrete mixture comprises a water to cementitious ratio (w/cm) of 0.9:1.

8. The concrete product of claim 6, wherein the zero-slump to near-zero-slump concrete mixture comprises a water to cementitious ratio (w/cm) of 2.0:1.

9. The concrete product of claim 8, wherein the zero-slump to near-zero-slump concrete mixture comprises has less than 0.2 inch of slump when tested according to ASTM International C 143.

10. The concrete product of claim 9, wherein the zero-slump to near-zero-slump concrete mixture consists of aggregates, pigment, water repellent mortar, cement, and said predetermined amount of water in an amount of 100%+ water.

11. The concrete product of claim 9, wherein the zero-slump to near-zero-slump concrete mixture of the green unit maintains said molded predetermined shape of the concrete masonry unit from being retained in a mold for less than about 20 seconds.

12. The concrete product of claim 9, wherein the zero-slump to near-zero-slump concrete mixture of the green unit maintains said molded predetermined shape of the concrete masonry unit from being retained in the mold for no greater than 6 to 20 seconds.

13. The concrete product of claim 6, wherein the green unit sequesters ambient carbon dioxide over a period of time as it is cured and hardened so that the concrete product sequesters carbon of 5% to 13% weight percent of the cement over a 28 day period.

14. The concrete product of claim 6, wherein the green unit is cured and hardened outside the mold so as to form the molded predetermined shape of the concrete masonry unit.

15. The concrete product of claim 1, wherein the green unit sequesters ambient carbon dioxide over a period of time as it is cured and hardened so that the concrete product sequesters carbon of 5% to 13% weight percent of the cement over a 28 day period.

16. The concrete product of claim 15, wherein the green unit is cured and hardened outside the mold so as to form the molded predetermined shape of the concrete masonry unit.

* * * * *